United States Patent [19]

Rigal et al.

[11] Patent Number: 5,429,358
[45] Date of Patent: Jul. 4, 1995

[54] GOLF CLUB AND METHODS OF ASSEMBLING AND DISASSEMBLING SAME

[75] Inventors: Jean-Pierre Rigal, Mesigny; Benoît Vincent, Annecy le Vieux, both of France

[73] Assignee: Taylor Made Golf Company, Inc., Carlsbad, Calif.

[21] Appl. No.: 66,444

[22] Filed: May 25, 1993

[30] Foreign Application Priority Data

May 25, 1992 [FR] France .................. 92 06522

[51] Int. Cl.$^6$ ............................................ A63B 53/02
[52] U.S. Cl. .................................. 273/80.3; 273/80.4
[58] Field of Search ............... 273/167 R, 80 R, 80 B, 273/80.1, 80.2, 80.3, 80.4, 80.5, 80.6, 80.7, 80.8, 79, 167 K

[56] References Cited

U.S. PATENT DOCUMENTS

| | | | |
|---|---|---|---|
| 1,167,922 | 1/1916 | Offutt | 273/80.3 |
| 1,480,056 | 1/1924 | Flint | 273/80.5 |
| 1,550,647 | 8/1925 | Mattern | 273/80.3 |
| 1,551,563 | 9/1925 | Heller | 273/80.3 |
| 1,601,770 | 10/1926 | Reach | 273/80.4 |
| 1,615,232 | 1/1927 | Pryde | 273/80.3 |
| 1,895,417 | 1/1933 | Lard | 273/80.8 |
| 2,001,342 | 5/1935 | Dyce | 273/80.1 |
| 2,016,218 | 10/1935 | Stephens | 273/80.4 |
| 2,020,048 | 11/1935 | Cook | 273/80.4 |
| 2,153,880 | 4/1939 | Barnhart | 273/80.4 |
| 2,662,045 | 12/1953 | Baggott . | |
| 3,572,709 | 3/1971 | Risher | 273/80.2 |
| 3,810,621 | 5/1974 | Mills | 273/167 K |
| 4,317,986 | 3/1982 | Sullivan . | |
| 4,326,716 | 4/1982 | Lacoste | 273/167 R |
| 4,783,893 | 11/1988 | Farino . | |
| 4,836,545 | 6/1989 | Pompa | 273/80 R |
| 4,899,430 | 2/1990 | Farino . | |
| 4,954,198 | 9/1990 | Viellard . | |
| 5,253,867 | 10/1993 | Gafner | 273/80 B |

FOREIGN PATENT DOCUMENTS

| | | |
|---|---|---|
| 1170720 | 1/1959 | France . |
| 4006658 | 8/1991 | Germany . |
| 420332 | 11/1934 | United Kingdom . |
| 2207358 | 2/1989 | United Kingdom . |
| 2237998 | 5/1991 | United Kingdom . |
| 2241173 | 8/1991 | United Kingdom . |

*Primary Examiner*—Sebastiano Passaniti
*Attorney, Agent, or Firm*—Sandler, Greenblum & Bernstein

[57] ABSTRACT

A golf club and methods of assembling and disassembling the shaft and head. The golf club includes a shaft and a head affixed to one another by having a male portion embedded in a female portion, or embedding hole, the two being made of a composite material or plastic, and a heat-conductive intermediate ring is located between the internal peripheral surface of the female portion and the external peripheral surface of the male portion and projecting outwardly from the embedding hole. The shaft is removed by heating outwardly projecting portion of the intermediate ring to soften the adhesive that had secured the shaft to the head.

12 Claims, 4 Drawing Sheets

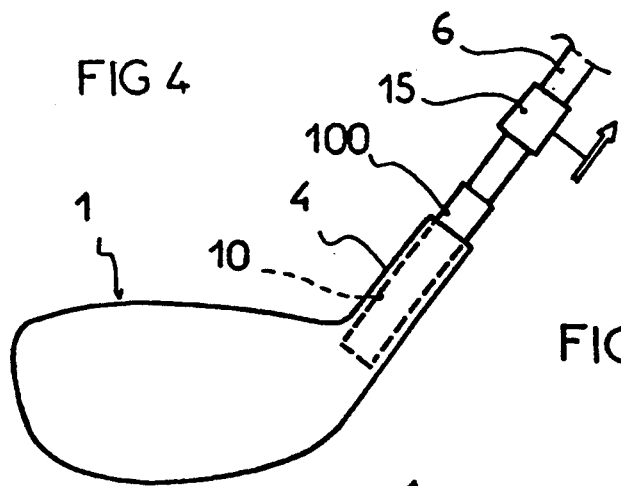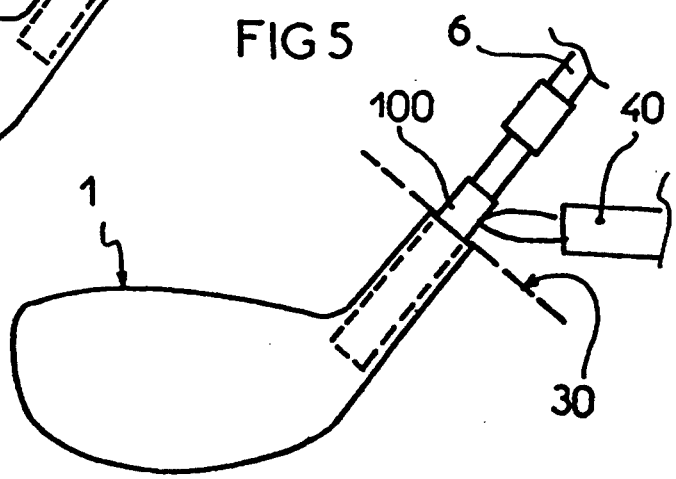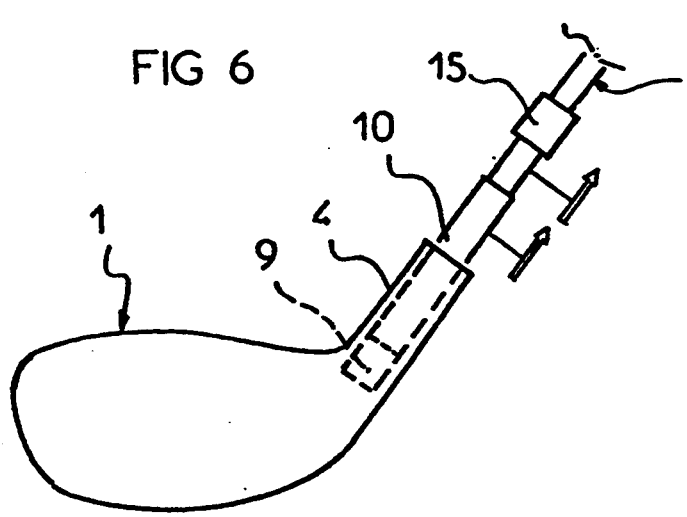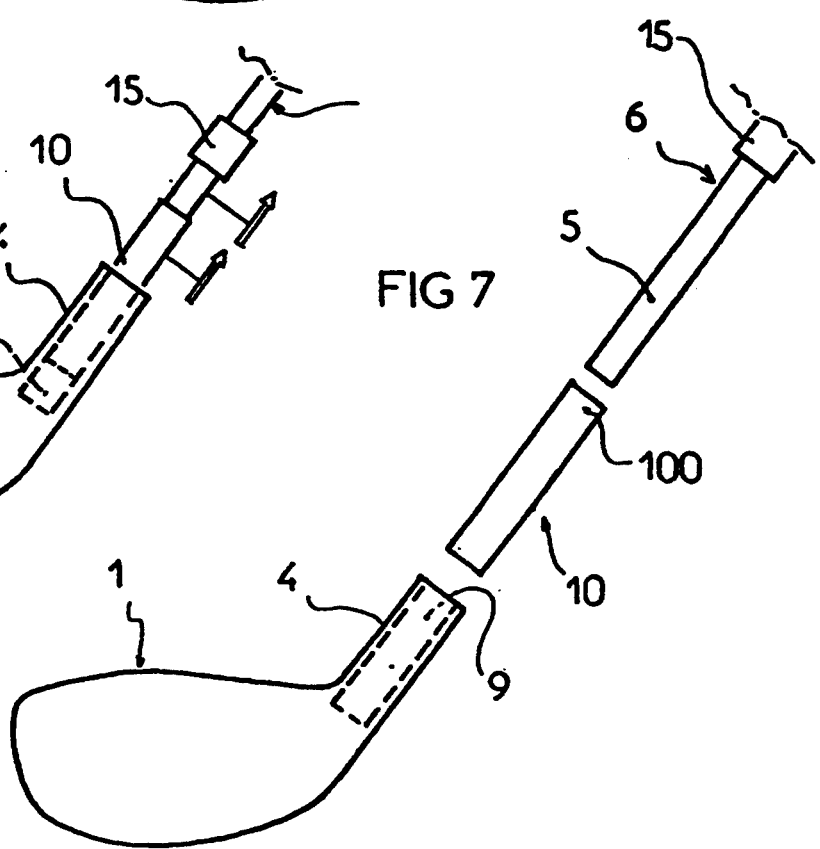

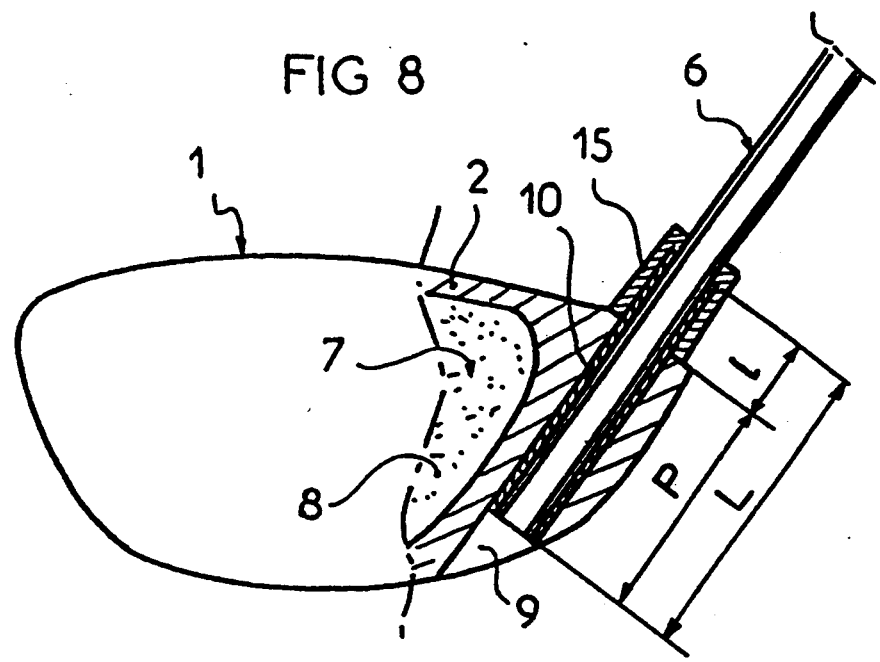
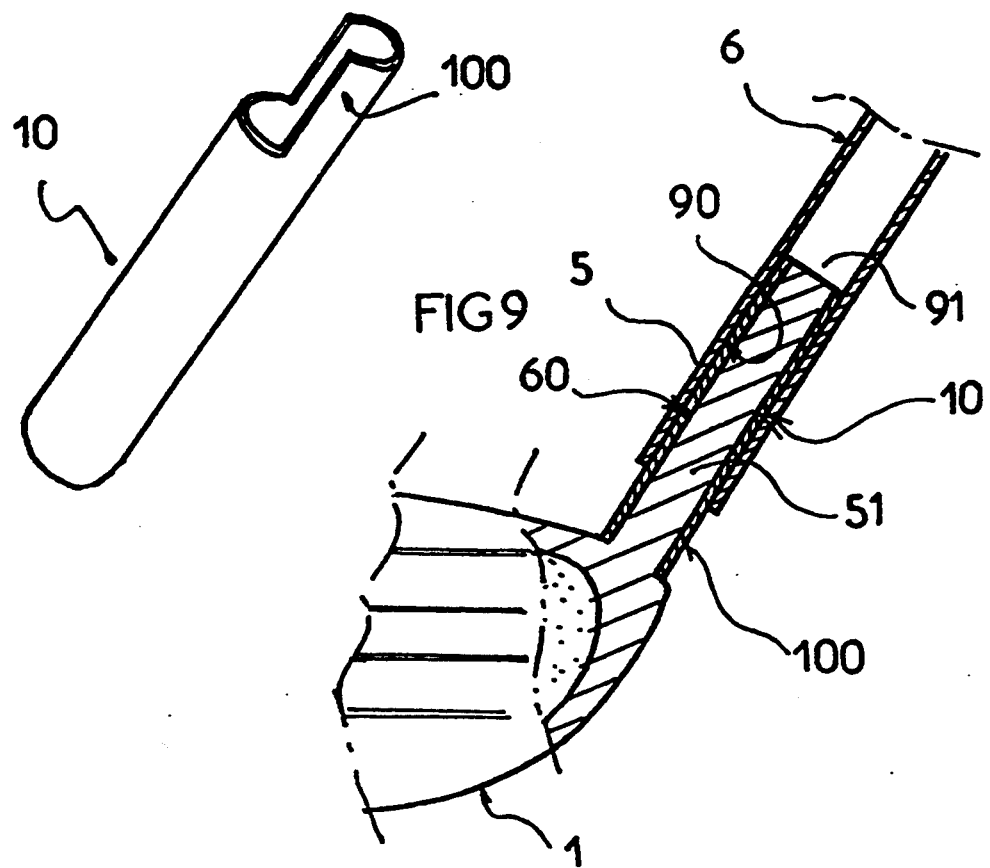

GOLF CLUB AND METHODS OF ASSEMBLING AND DISASSEMBLING SAME

BACKGROUND OF THE INVENTION

1. Field of the Invention

The present invention is related to a golf club and more specifically to an improvement related to a method of the assembly of its shaft with the head. The invention is also related to a method enabling the shaft to be disassembled from the head.

2. Discussion of Background and Relevant Information

While playing golf, the player hits a golf ball in order to displace it, by propelling it with an implement referred to as a golf club which is constituted by a shaft having a head at its lower end, whereas its upper end is equipped with a handle, often referred to as a grip.

In a known manner, the head itself is extended laterally from the shaft by a neck adapted to receive the shaft. To this end, the neck has an opening in which the lower end of the shaft is affixed, typically by means of an adhesive of the epoxy type.

Often, the player wants to change the shaft of the club, either because it is damaged, or because it is not completely adapted to his or her game. Indeed, the precision of shots depends on a certain number of parameters, and especially those related to the stiffness of the shaft and/or its structure. Therefore, the golfer desires either to change clubs or to have the shafts of the clubs changed. The operation of changing the shafts is not very problematic, and is very easy indeed for clubs whose head and shaft are metallic, because the club need only be heated locally in the area or zone at which the shaft is embedded in the head, causing thereby the softening or destruction of the adhesive, thus enabling the shaft to be withdrawn and completely removed from the head.

This operation is unfortunately not possible for clubs whose embedding zone cannot be heated. This is the case for a club whose head, at least in its shaft embedding zone is made of plastic or of a composite material, and whose shaft is not made of steel but, for example, is made of a composite material. It is easy to understand that heating the embedding zone of the shaft would cause irreparable damage to the head and to the shaft, which would then no longer be usable.

SUMMARY OF THE INVENTION

An object of the present invention is to overcome the aforementioned disadvantage and to propose a new arrangement for the assembly of the shaft with the head, enabling successive disassemblies in a very convenient manner without damaging the elements.

Thus, the golf club according to the invention includes a head; a shaft; one of the head and shaft having a male member and the other of the head and shaft having a female member, the female member having an opening and an internal peripheral surface, the male member having an external peripheral surface; the male member being positioned and affixed in the opening of the female member; and an intermediate ring positioned between the internal peripheral surface of the female member and the external peripheral surface of the male member, wherein the intermediate ring is made of a heat-conducting material and having an external peripheral surface projecting outwardly beyond the internal peripheral surface of the opening of the female member.

The invention is particularly advantageous wherein each of the male member and the female member is made of a non-metallic material. For example, a composite or plastic is contemplated. The intermediate ring is preferably metallic. For example, steel or aluminum is contemplated.

According to a more particular aspect of the invention, the shaft includes a lower end, the male member is constituted by the lower end of the shaft, and the opening of the female member comprises a hole in the head.

According to a variation, the opening of the female member comprises a hole in the neck of the head of the club, within which the male member is inserted.

According to another variation, the male member extends from the head and the opening of the female member is constituted by a hole in the lower end of the shaft.

In a particular embodiment, the golf club further includes a covering ring for covering the external peripheral surface of the intermediate ring. The covering ring could be made of a plastic material, for example.

According to a particular aspect of the invention, a first layer of adhesive is located between the internal peripheral surface of the intermediate ring and the external peripheral surface of the lower part of the shaft and a second layer of adhesive is located between the external peripheral surface of the intermediate ring and the internal peripheral surface of the opening of the female member. It is contemplated that the adhesive can be of the epoxy type. In accordance with one embodiment of the invention, the intermediate ring has a thickness of approximately 0.5 millimeters.

A method according to the present invention includes a method of assembling a shaft of a golf club to a head of the golf club with the use of an intermediate metallic or heat-conductive ring and a quantity of adhesive, the method including inserting the male member into the female member and positioning the intermediate ring between the external surface of the male member and the internal surface of the female member so that an end of the intermediate ring extends beyond the internal surface of the female member, whereby at least first portion of the quantity of adhesive is located between the intermediate metallic ring and the external surface of the male member and at least a second portion of the quantity of adhesive is located between the intermediate ring and the internal surface of the female member.

According to a particular embodiment, the step of positioning the intermediate metallic ring includes positioning the intermediate ring so that an end portion having a length of at least 10 millimeters extends beyond the internal surface of the female member.

The present invention includes an advantageous method of disassembling the shaft from the head of the golf club, whereby the method includes the steps of heating the outwardly projecting external surface of the intermediate ring to soften the adhesive and removing the shaft from the head.

According to the variation in which a covering ring is utilized, the method of disassembling further includes the step of removing the covering ring from the outwardly projecting external surface of the intermediate ring to thereby expose the outwardly projecting external surface of the intermediate ring.

More particularly according to the method of disassembling the shaft from the head, the adhesive comprises a first quantity of adhesive located between the intermediate ring and the external surface of the male member and a second quantity of adhesive located between the intermediate ring and the internal surface of the female member, wherein the step of heating to soften the adhesive includes heating to soften the first and second quantities of adhesive.

BRIEF DESCRIPTION OF THE DRAWINGS

Other characteristics and advantages of the invention will become apparent from the description that follows with reference to the annexed drawings which are provided only as non-limiting examples. The figures of the invention only illustrate the lower portion of the club, the upper wall of the shaft comprising the grip being well known in the art.

FIGS. 4–7 illustrate the disassembly method in accordance with the invention, wherein:

FIG. 4 shows a preliminary step;

FIG. 5 represents a step related to the softening of the adhesive;

FIG. 6 illustrates the actual disassembly step of the shaft from the head; and

FIG. 7 shows the disassembled club.

FIGS. 8 and 9 are views similar to FIG. 1 showing a variation of the invention thereof.

FIG. 12 is a perspective view of a variation of the embodiment of the intermediate ring.

DETAILED DESCRIPTION OF THE PREFERRED EMBODIMENTS

Figure 1:
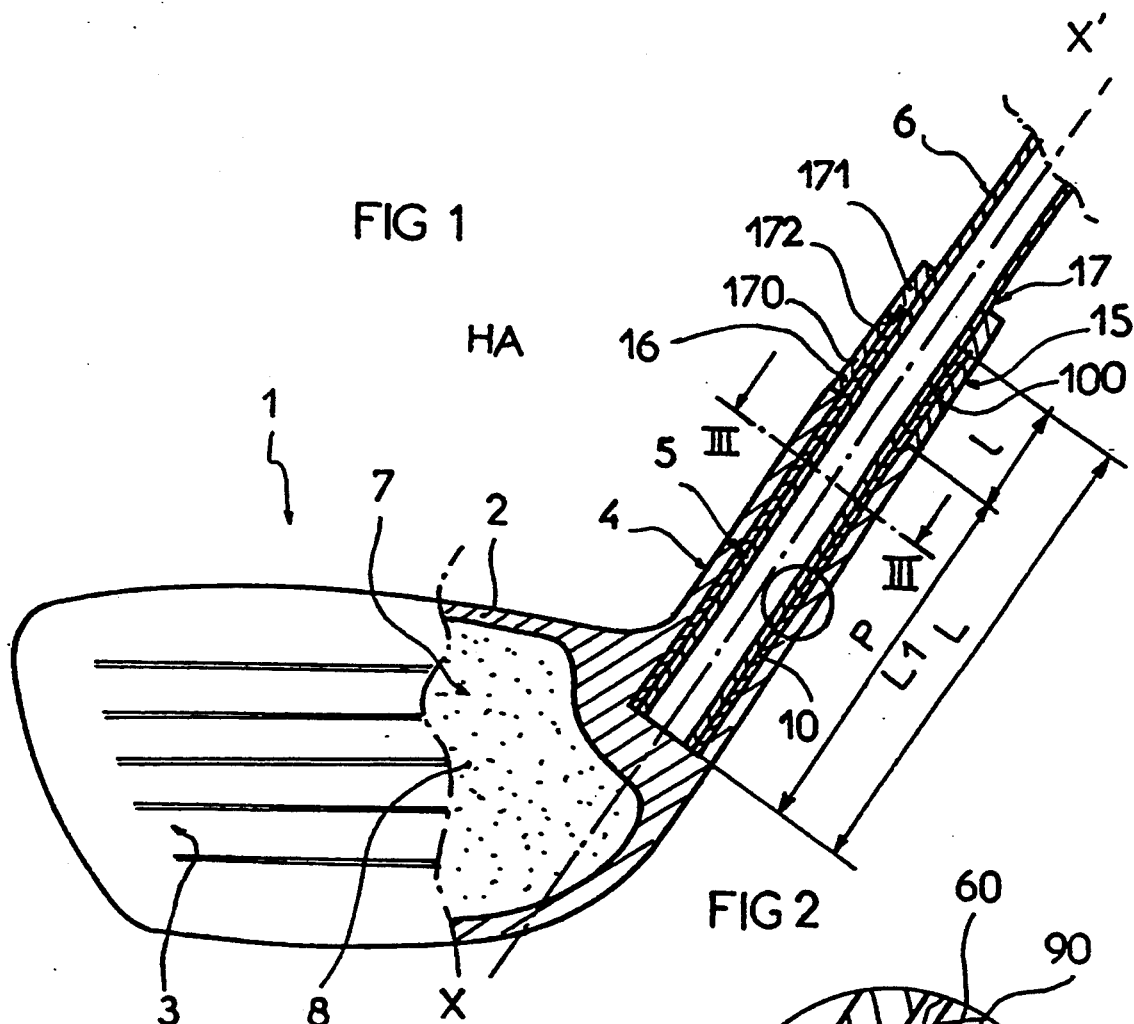
FIG. 1 is a drawing of the lower portion of an embodiment of a club as per the invention, in a partial section along a diametrical plane of the shaft.
Figure 3:
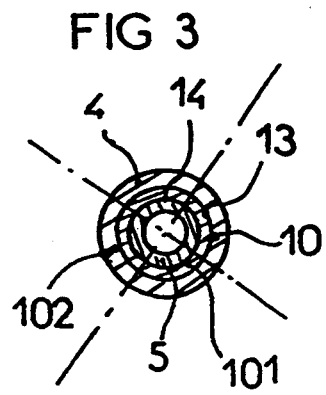
FIG. 3 is a transverse sectional view along III—III of FIG. 1.
Figure 2:
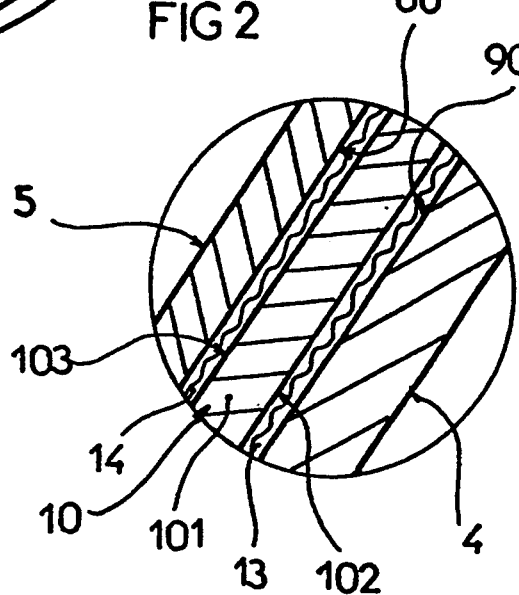
FIG. 2 is a view, on a larger scale, showing the invention in greater detail.

In preferred embodiment of the invention, the golf club includes a shaft and a head affixed to one another by embedding of a male portion in a female portion, or embedding hole, both elements being made of a non-metallic composite material or plastic, wherein an intermediate ring, preferably made of metal or a good heat-conducting material, is located between the peripheral internal surface of the female portion or embedding hole and the external peripheral surface of the male portion and projecting outwardly from the embedding hole.

According to a particular embodiment of the invention, the male portion is constituted by the lower end of the shaft, whereas the female portion is constituted by an embedding hole provided in the head or the neck.

According to another arrangement, the male portion is affixed to the head, whereas the female portion is constituted by an embedding hole provided in the lower end of the shaft.

According to a preferred arrangement, the golf club includes a shaft whose lower portion, made of a composite material, is embedded in an embedding hole provided in the embedding zone of the plastic shaft or the composite material of a head, the intermediate metallic ring being located between the external peripheral surface of the lower portion of the shaft and the internal peripheral surface of the embedding hole projecting outwardly from the embedding hole.

According to other characteristics of the invention, the intermediate ring includes a peripheral wall comprising an internal peripheral surface adhered to the external peripheral surface of the lower portion of the shaft by a first adhesive layer and an external peripheral surface adhered to the internal peripheral surface of the embedding hole by a second adhesive layer. The intermediate ring is made of aluminum or steel, for example, and is not very thick.

According to a special arrangement, the upper portion of the intermediate ring projecting outwardly from the embedding hole is tubular or partially tubular and can be covered by a covering ring made of a plastic material, for example.

In addition to the method of assembling the shaft to the head of the golf club, the invention is also related to a method of disassembling the shaft from the golf club, and includes, in a main step, heating the portion of the intermediate ring that projects beyond the embedding hole, to soften or destroy the adhesive by thermal conduction, and thus enable easy disassembly without damage.

With reference to the drawings, the head 1 of the club illustrated therein is of the "wood" type and comprises, for example, a shell 2 having a hitting or striking surface 3 extended laterally and upwardly by a neck 4 adapted to receive the lower end 5 of the shaft 6 of the club.

The head is constituted, for example, by an envelope made of a composite material or plastic, to form an internal cavity 7 advantageously filled with a foam 8 such as, for example, polyurethane foam. The neck 4 is constituted by a lateral extension, extending generally upwardly in the direction HA and comprises an embedding hole 9 having an axis X-X' closed at its lower portion and ending upwardly to enable embedding of the lower portion 5 of the shaft which is formed by a cylindrical tube, made from a composite material.

According to the invention, an intermediate ring 10 is located between the external peripheral surface 60 of the lower end 5 of shaft 6 and the internal peripheral surface 90 of embedding hole 9. According to the embodiment represented, the intermediate ring 10 has a length L greater than the embedding length L1 of the lower end of the shaft, corresponding to the depth P of the embedding hole. Thus, the upper end 100 of the intermediate ring 10 projects outwardly from the embedding hole. It projects outwardly by a length l equal to the difference between its total length L and depth P of the corresponding embedding hole 9. Length l can be between 10 and 25 millimeters, for example. The intermediate ring 10 is a ring, preferably metallic, having a relatively small thickness, preferably no greater than that of the neck or shaft, possibly lesser than one or both, and comprises a peripheral wall 101 made of steel or aluminum, for example.

To ensure retention of the embedding and assembly of shaft 6 in the head and more specifically in the embedding opening of the head, first and second adhesive layers are provided. The first adhesive layer 13 is located between the external peripheral surface 102 of the intermediate ring and the internal peripheral surface 90 of the embedding hole. The second adhesive layer 14 is located between the external peripheral surface 60 of the lower end 5 of shaft 6 and the internal peripheral surface 103 of ring 10. Naturally, the first adhesive layer 13 does not extend along the entire length L of ring 10, but only along its embedding length L1, whereas the second layer 14 can extend along the entire length L of the intermediate ring 10.

Advantageously, a covering ring 15 is provided to cover the upper portion 100 of the intermediate ring projecting from the embedding hole 9. The covering ring thus hides the projecting portion of the intermediate ring and therefore ensures a better appearance for the assembly. It is made of a plastic material, for example, and comprises a peripheral wall 16 peripherally limiting an axial hole 17 and includes two portions, viz., a lower portion 170 covering the end of the intermediate ring 10, followed by an upper portion 171 separated from the first by a shoulder 172 and whose diameter is substantially that of the shaft.

The assembly described hereinabove enables the easy disassembly of the shaft. The disassembly operation is illustrated in its various steps by FIGS. 4-7.

In a preliminary or first step "a" the covering ring 15 is removed, as is illustrated in FIG. 4. Inasmuch as the covering ring is preferably secured by a simple friction fit, its removal is achieved by merely raising same along shaft 6, as shown in FIG. 4. The operation of removing the covering ring 15 enables the upper projecting portion 100 of intermediate ring 10 to become visible and accessible for the next step.

In a second or main step "b", the projecting portion or upper end 100 of the intermediate ring 10 is heated by means of a welding torch 40 or a heating collar, for example, as is represented in FIG. 5, and since the projecting portion of the intermediate ring is metallic, it plays the role of a heat conductor. As the heat spreads all along the ring, it causes the softening or destruction of the adhesive without damaging the head, especially its neck, nor the shaft, especially its lower portion. Thus, although as mentioned above, the length l of upper end can be between 10 and 25 millimeters, it is clear that the length must be sufficient to permit the convenience heating as just described.

Once the adhesive 13, 14 is adequately softened, it loses its adhesive power, and it is therefore possible to remove the shaft, in a third step "c" as is represented in FIGS. 6 and 7.

FIG. 8 is a view similar to FIG. 1, illustrating a variation according to which the head does not include a neck. According to this arrangement, the head comprises an embedding hole 9 extending through the heel of the head from one side to the other, and adapted to receive the lower portion of shaft 6. The actual head, as described with reference to the previous embodiment, comprises a shell 2 forming an internal cavity 7 filled with a filling material 8 such as polyurethane foam. This variation comprises, as mentioned previously, an intermediate ring playing the role of a heat conductor enabling, as also mentioned previously, an easy disassembly of the shaft without damaging the elements. To facilitate the understanding of the drawing, those elements that are similar to the first embodiment have been provided with the same reference numerals.

As has already been mentioned, the head as well as the shaft are made of plastic or a composite material at least in the embedding zone, and are, for example, obtained by a layering of woven carbon fiber and/or aramide fiber webs, impregnated with a thermoplastic or thermohardenable resin. The adhesive used for affixing the shaft and the ring can be of the epoxy type, for example.

In the embodiments illustrated and described previously, the male portion is constituted by the lower portion 5 of shaft 6 and the female embedding portion is constituted by an embedding hole 9 provided directly in the head 1, as shown in FIG. 8, or in an affixed element such as a neck 4, as shown FIGS. 1-7.

In the embodiment illustrated in FIG. 9, the embedding is reversed, namely the male portion 51 is affixed to head 1, whereas the female portion 91 is constituted by the central hole of the lower portion of shaft 6. Thus, head 1 comprises a lateral cylindrical extension 51 constituting the male embedding portion which is engaged in the female portion 91 constituting the embedding hole formed by the inside of the end 5 of shaft 6. An intermediate ring 10 is provided whose lower end 100 projects outside the embedding hole. As mentioned previously, the intermediate ring 10 is located between the internal peripheral surface 90 of the female portion 91 and the external peripheral surface 60 of the male portion 51.

Figure 10:
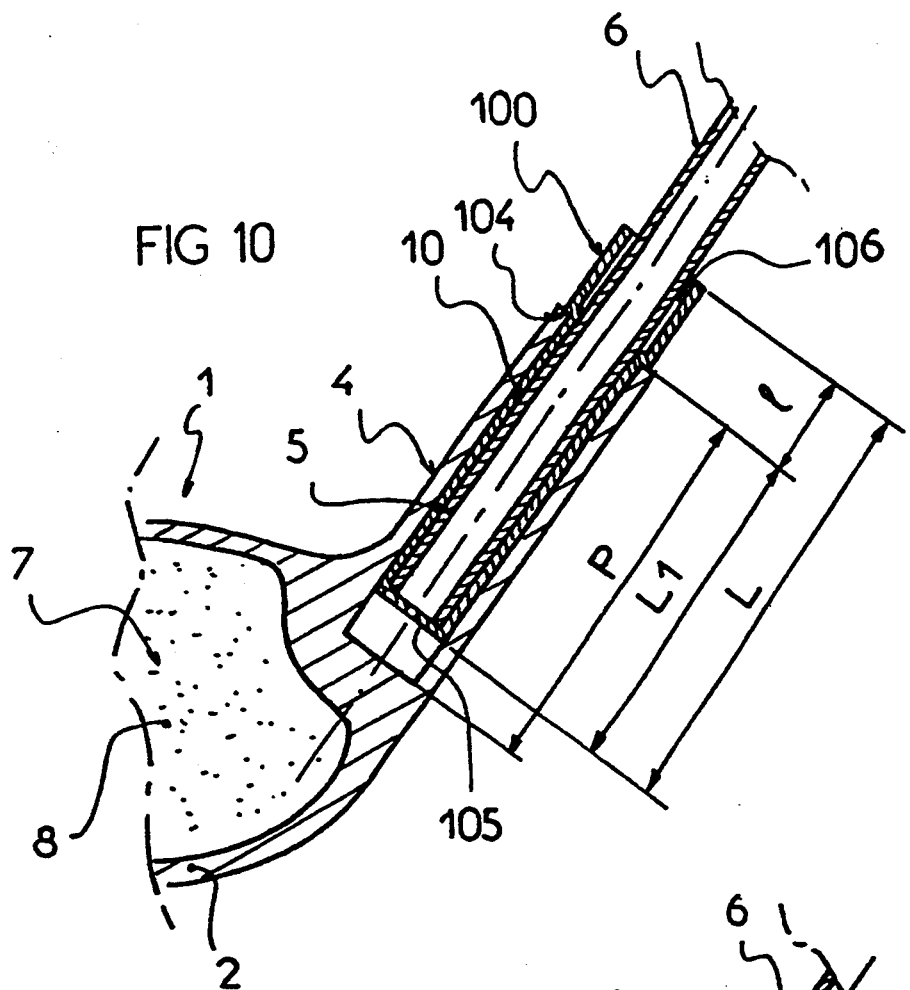
FIGS. 10 and 11 are partial views similar to FIG. 1 showing two further embodiments.
Figure 11:
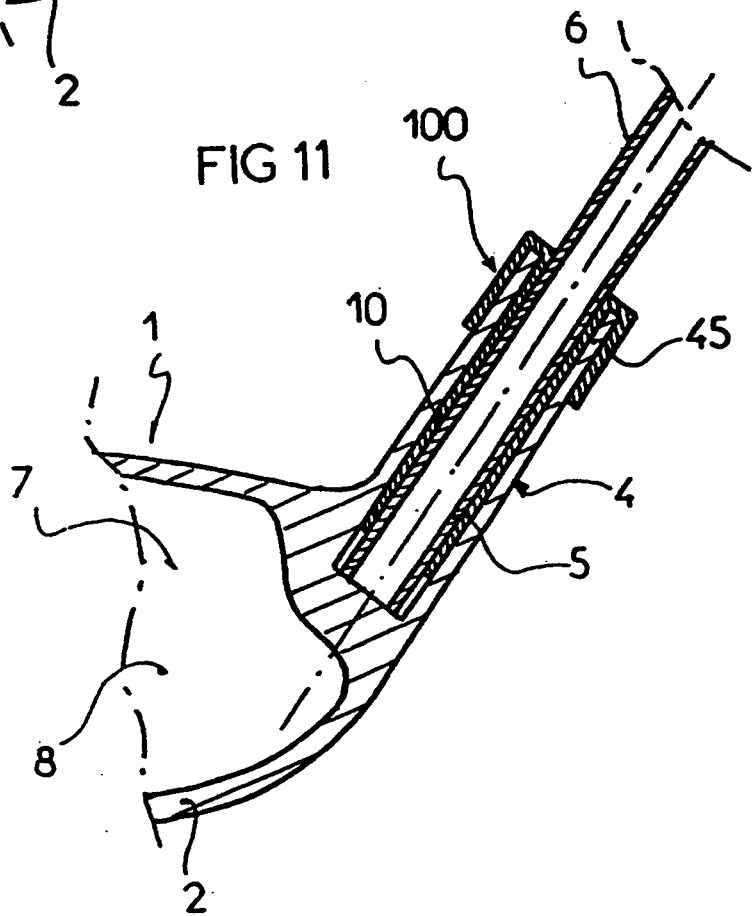

FIGS. 10 and 11 illustrate variations of the embodiment of the intermediate ring 10. In the variation of FIG. 10, intermediate ring 10 has an embedding length L1 which is smaller than depth P of embedding hole 9. Further, the embedding depth of the ring 10 is limited by a peripheral shoulder 104. On the other hand, the projecting portion 100 of the ring has an internal diameter which is greater than that of the remainder of the ring, to form an annular space 106 about shaft 6. It is understood that the projecting end of the ring can be covered by a covering ring. The ring 10 includes a lower end wall 105 acting as an abutment to the lower end of the shaft.

FIG. 11 illustrates another variation according to which ring 10 is not embedded along the entire depth P of embedding hole 9 and its projecting end 100 externally covers the upper portion 45 of neck 4.

FIG. 12 illustrates, in a perspective view, a variation of the embodiment of intermediate ring 10 according to which the projecting portion 100 adapted to be heated is only partially tubular. In the drawing, the projecting portion is semi-tubular. Nevertheless, the function of the projecting portion according to the invention is maintained.

In case a direct flame is used to heat the intermediate ring 10, a protective element 30, in the form of a shield, can be provided such as is represented in dotted and dashed lines in FIG. 5, located at the tip of the neck and adapted to protect the club head 1 from said flame.

The instant application is based upon French patent application No. 92.06522 of May 25, 1992, the disclosure of which is hereby expressly incorporated by reference thereto, and the priority of which is hereby claimed.

The invention is not limited to the embodiments described and represented as examples hereinabove, but also comprises all technical equivalents and combinations thereof.

What is claimed is:

1. A golf club comprising:
   a head comprised of a non-metallic material and a shaft comprised of a non-metallic material, whereby one of said head and said shaft having a male portion and the other of said head said shaft having a female portion; and
   a joint for connecting said shaft to said head, said joint comprising:
   said male portion and said female portion, whereby said female portion has a socket forming an imbedding hole and an internal peripheral surface and said male portion has an external peripheral surface, and whereby said male portion is embedded in said socket of said female portion;

an intermediate heat conductor ring interposed between said inner peripheral surface of said socket of said female portion and said outer peripheral surface of said male portion, said intermediate heat conductor ring comprising a portion projecting from said socket of said female portion; and at least a layer of adhesive positioned between said intermediate heat conductor ring and at least one of:

said inner peripheral surface of said socket of said female portion; and said outer peripheral surface of said male portion;

said layer of adhesive being a material consisting of means for losing adhesion upon heating of said portion of said intermediate ring projecting from said socket of said female portion.

2. A golf club as defined by claim 1, wherein:
said non-metallic material of both said male portion and said female portion consisting of a composite material.

3. A golf club as defined by claim 1, wherein:
said non-metallic material of both said male portion and said female portion consisting of a plastic material.

4. A golf club as defined by claim 1, wherein:
said heat conductor ring is comprised of metal.

5. A golf club as defined by claim 1, wherein:
the shaft comprises a lower end;
the male portion is constituted by the lower end of the shaft; and
the embedding hole of the female portion comprises a hole in the head.

6. A golf club as defined by claim 1, wherein:
the shaft comprises a lower end;
the male portion is constituted by the lower end of the shaft;
the head comprises a neck; and
the embedding hole of the female portion comprises a hole in the neck of the head.

7. A golf club as defined by claim 1, wherein:
the male portion extends from the head;
the shaft comprises a lower end; and
the embedding hole of the female portion is constituted by a hole in the lower end of the shaft.

8. A golf club as defined by claim 1, wherein:
the intermediate ring is made of steel.

9. A golf club as defined by claim 1, wherein:
the intermediate ring is made of aluminum.

10. A golf club as defined by claim 1, further comprising:
a covering ring covering the outwardly projecting portion of the intermediate ring.

11. A golf club as defined by claim 10, wherein:
the covering ring is made of a plastic material.

12. A golf club as defined by claim 1, wherein:
the head comprises a neck; and
the neck comprises the embedding hole.

* * * * *